(12) United States Patent
Skokan

(10) Patent No.: US 10,569,764 B2
(45) Date of Patent: Feb. 25, 2020

(54) APPARATUS AND METHOD FOR ENERGY AND SPACE EFFICIENT TRANSPORTATION SYSTEM

(71) Applicant: Zdenek Stan Emil Skokan, Mountain View, CA (US)

(72) Inventor: Zdenek Stan Emil Skokan, Mountain View, CA (US)

(73) Assignee: Zdenek Stan Emil Skokan, Mountain View, CA (US)

( * ) Notice: Subject to any disclaimer, the term of this patent is extended or adjusted under 35 U.S.C. 154(b) by 0 days.

(21) Appl. No.: 16/009,052

(22) Filed: Jun. 14, 2018

(65) Prior Publication Data

US 2019/0381997 A1 Dec. 19, 2019

(51) Int. Cl.
| | |
|---|---|
| *B60W 30/02* | (2012.01) |
| *B60B 17/00* | (2006.01) |
| *B60W 50/08* | (2020.01) |
| *B60W 40/04* | (2006.01) |
| *B60W 30/12* | (2020.01) |

(52) U.S. Cl.
CPC ......... *B60W 30/02* (2013.01); *B60B 17/0082* (2013.01); *B60W 30/12* (2013.01); *B60W 40/04* (2013.01); *B60W 50/08* (2013.01)

(58) Field of Classification Search
CPC ......... B61B 15/00; B61B 10/04; B61B 13/04; B61B 1/00; B60W 30/12; B60W 30/00; B60W 10/26; B60W 30/02; B60W 2550/20; B60B 17/0082; B60B 17/00; B60B 33/0092; B60B 7/06; B60B 35/125; B60B 2900/572; B60B 19/00
See application file for complete search history.

(56) References Cited

U.S. PATENT DOCUMENTS

| | | | | |
|---|---|---|---|---|
| 3,254,608 A | * | 6/1966 | Alden | B61B 15/00 104/295 |
| 3,791,308 A | * | 2/1974 | Hartz | B61B 5/00 104/139 |
| 3,890,904 A | * | 6/1975 | Edwards | B61B 5/02 104/121 |
| 3,985,081 A | * | 10/1976 | Sullivan, II | B61B 13/06 104/23.2 |
| 4,042,308 A | * | 8/1977 | Freedman | E01B 25/10 404/1 |
| 4,274,335 A | * | 6/1981 | Boland | B61B 12/02 104/122 |
| 4,503,778 A | * | 3/1985 | Wilson | B61B 1/02 104/119 |

(Continued)

*Primary Examiner* — Hunter B Lonsberry
*Assistant Examiner* — Luis A Martinez Borrero
(74) *Attorney, Agent, or Firm* — Geeta Kadambi; Riddhi IP LLC

(57) ABSTRACT

A specific vehicle having a unique structure, modified wheel design and capable of running on a dedicated lane with uniform speed is described. The transportation system controls the traffic flow from and to the arterial roads to the highways. This allows the traffic management system to efficiently manage the commute time traffic and avoid congestion. The modified space and energy transportation management system and method of using it enables efficient transportation management while saving time and energy for service providers as well as users.

15 Claims, 19 Drawing Sheets

(56) References Cited

U.S. PATENT DOCUMENTS

| Patent/Publication | Date | Inventor | Classification |
|---|---|---|---|
| 4,671,183 A * | 6/1987 | Fujita | B61B 13/04 104/110 |
| 4,690,064 A * | 9/1987 | Owen | B61B 1/02 104/119 |
| 5,456,183 A * | 10/1995 | Geldbaugh | B61B 5/00 104/110 |
| 5,845,583 A * | 12/1998 | Jensen | B60F 1/00 105/72.2 |
| 5,934,198 A * | 8/1999 | Fraser | B61B 5/02 104/119 |
| 6,012,396 A * | 1/2000 | Schulz | B61B 15/00 105/215.1 |
| 6,047,645 A * | 4/2000 | Cornwell | A63G 7/00 104/124 |
| 6,129,025 A * | 10/2000 | Minakami | B60L 5/005 104/88.01 |
| 6,321,657 B1 * | 11/2001 | Owen | B61B 1/02 104/119 |
| 6,324,994 B1 * | 12/2001 | Glenn | B60F 1/02 105/215.2 |
| 6,450,103 B2 * | 9/2002 | Svensson | B60L 13/06 104/120 |
| 6,564,516 B1 * | 5/2003 | Svensson | B61B 13/04 104/118 |
| 6,564,721 B2 * | 5/2003 | Stiles | B61B 13/04 104/124 |
| 6,742,458 B2 * | 6/2004 | Henderson | B60P 1/43 104/124 |
| 7,246,559 B2 * | 7/2007 | Stromberg | B61B 1/02 104/124 |
| 7,302,319 B2 * | 11/2007 | Wu | B61L 27/04 104/27 |
| 7,721,656 B2 * | 5/2010 | Indio da Costa | B61B 5/025 104/124 |
| 7,788,000 B1 * | 8/2010 | Davis, Jr. | B60L 5/04 104/243 |
| 7,789,020 B2 * | 9/2010 | Li | B60F 1/04 104/130.01 |
| 7,975,618 B2 * | 7/2011 | Bullis | B60B 11/02 105/215.1 |
| 7,975,620 B2 * | 7/2011 | Pumpelly | B61B 13/04 105/215.2 |
| 8,342,101 B2 * | 1/2013 | Kissel | B61B 13/04 104/119 |
| 8,494,694 B2 * | 7/2013 | Dueck | B61B 7/00 104/112 |
| 8,950,337 B1 * | 2/2015 | Davis | E01B 25/00 104/124 |
| 9,096,235 B2 * | 8/2015 | Kissel | B61B 5/02 |
| 9,096,236 B2 * | 8/2015 | Kissel, Jr. | B61C 13/04 |
| 9,415,783 B2 * | 8/2016 | Kissel, Jr. | B61C 13/04 |
| 9,527,394 B1 * | 12/2016 | Tang | B60L 11/1818 |
| 9,809,933 B2 * | 11/2017 | Jacob | E01B 25/24 |
| 9,862,277 B2 * | 1/2018 | Dames | B60L 5/005 |
| 2001/0050026 A1 * | 12/2001 | Esposito | B60F 1/02 105/215.2 |
| 2002/0073876 A1 * | 6/2002 | Einar | B61B 13/04 104/125 |
| 2004/0225421 A1 * | 11/2004 | Wu | B61L 27/04 701/19 |
| 2005/0038575 A1 * | 2/2005 | Wu | B61L 27/04 701/19 |
| 2005/0204949 A1 * | 9/2005 | Jacob | B60F 1/04 105/72.2 |
| 2006/0196385 A1 * | 9/2006 | Stromberg | B61B 1/02 104/124 |
| 2006/0201376 A1 * | 9/2006 | Brigham | B61B 15/00 104/130.07 |
| 2007/0107621 A1 * | 5/2007 | Zou | B61B 5/02 104/130.01 |
| 2007/0252399 A1 * | 11/2007 | Hoehne | B60B 17/0055 295/1 |
| 2007/0256588 A1 * | 11/2007 | Costa | B61B 13/04 104/118 |
| 2007/0289477 A1 * | 12/2007 | Sobolewski | B60F 1/005 105/215.2 |
| 2009/0050011 A1 * | 2/2009 | Li | B60F 1/04 104/130.01 |
| 2010/0043665 A1 * | 2/2010 | Brigham | B61B 15/00 104/88.01 |
| 2010/0211238 A1 * | 8/2010 | David, Jr. | B60L 5/04 701/20 |
| 2013/0055921 A1 * | 3/2013 | Kissel, Jr. | B61C 13/04 104/124 |
| 2018/0065433 A1 * | 3/2018 | Sun | B60F 1/04 |
| 2018/0201139 A1 * | 7/2018 | Dames | B60L 5/005 |
| 2018/0257427 A1 * | 9/2018 | Hays | B60B 3/048 |
| 2019/0273412 A1 * | 9/2019 | Taikou | H02K 7/1846 |

* cited by examiner

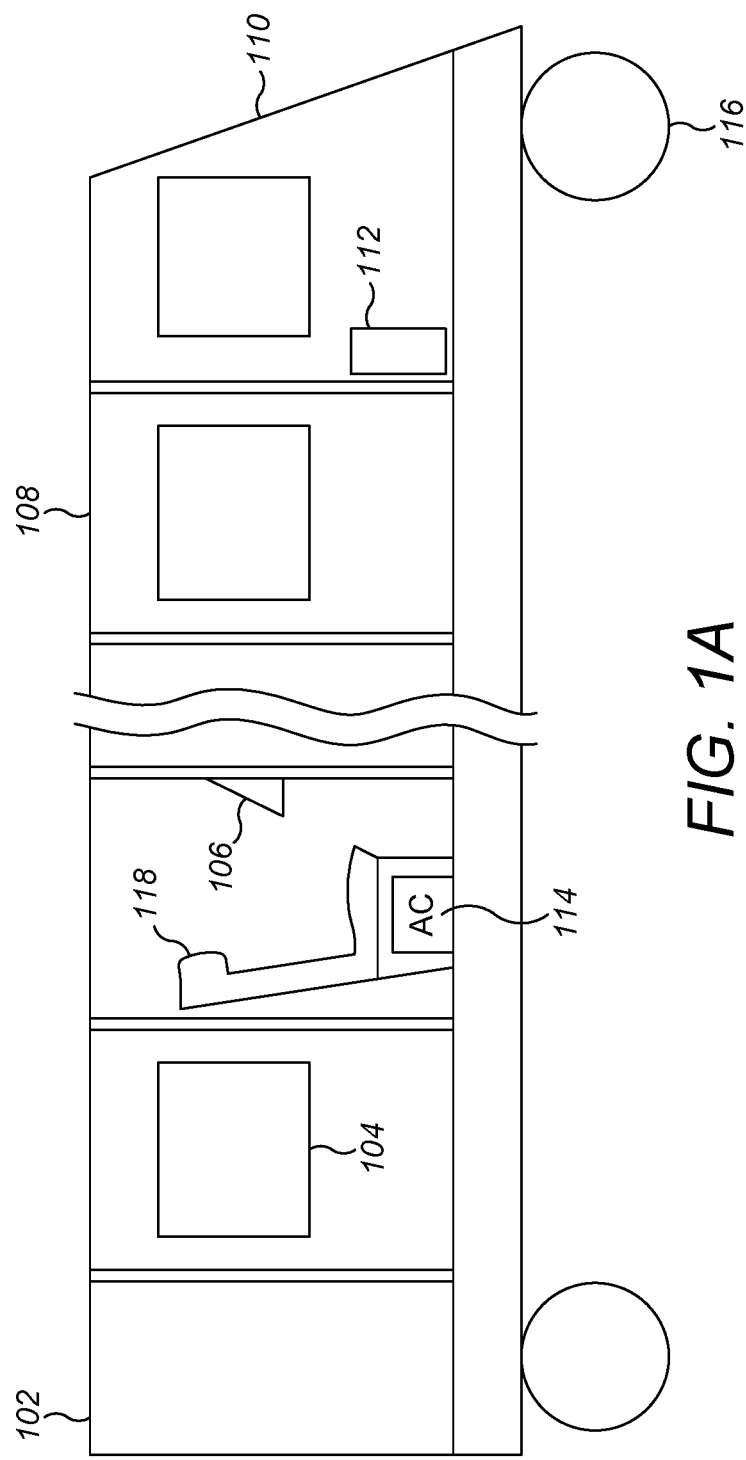

APPARATUS AND METHOD FOR ENERGY AND SPACE EFFICIENT TRANSPORTATION SYSTEM

FIELD OF TECHNOLOGY

This disclosure generally relates to an apparatus, method and system for energy and space efficient transportation system. Further, the disclosure relates to a vehicle with uniform speed control capability with modified dual use wheels and an express transportation system with dedicated lanes and traffic control system.

BACKGROUND

Over the last 100 years the automakers optimized design of a passenger vehicle for comfort of family travel over long distances. With increasing population and lagging infrastructure the roadways are becoming exceedingly packed and the commute has become inefficient. The time wasted by commuters and the energy being wasted due to traffic jams is a tremendous economic loss for the employee as well as employer. There has to be an efficient system to overcome this ever increasing problem.

SUMMARY

The instant disclosure addresses and discloses an apparatus and method for energy and space efficient transportation system comprising of a specific vehicle (vehicle), road design to suit said vehicle and a traffic management system to control the traffic flow so that said vehicle conforms to the existing transportation rules. In one embodiment, the specific vehicle that is battery and/or roadway powered electric vehicle driven by a driver or autonomous vehicle is disclosed. In another embodiment, a modified wheel design and/or tire design for the said specific vehicle to suit the dedicated lane or rail bed lane is disclosed. In one embodiment, the specific vehicle that is battery powered has a frontal design that reduces wind resistance for optimal use. In another embodiment, the specific vehicle has a tire design that is modified to accommodate the rail and road design. In another embodiment, the tire design for the vehicle is modified and has two modes of contact with the surface of the road way or the rail. In another embodiment, the specific vehicle has two different brake systems. In another embodiment, the specific vehicle is modular. In one embodiment, the specific vehicle has communication system and may be controlled remotely. The said specific vehicle, in one embodiment, may be a driverless car. In one embodiment the specific vehicle has a specific steering wheel design to control the specific vehicle and communicate with the system.

The transportation system has a dedicated lane system for the said vehicle. In one embodiment, the lanes are designated for highways and streets in the same way or differently to accommodate optimal traffic flow. The dedicated lanes have rail tracks, in one embodiment, which controls the travel path of the said specific vehicle. In another embodiment, the system also provides speed, steering control and breaking system for the said specific vehicle. In another embodiment, the dedicated lane also has an indentation to accommodate the steering by the soft portion of the tire at the entry/exit areas of the dedicated rail equipped lane and enables transition at high speed.

In one embodiment, traffic management system has several modules to control several functions for the said vehicle. The system allows, in one embodiment, for the user to communicate and use the said specific vehicle using any wifi based means including mobile devices. The vehicle speed is controlled by a secure communication connection. Other features will be apparent from the accompanying drawings and from the detailed description that follows.

BRIEF DESCRIPTION OF DRAWINGS

Example embodiments are illustrated by way of example and not limitation in the figures of the accompanying drawings, in which:

FIGS. 1A, 1B, 1C and 1D show the specific vehicle design that is unique to be used in the traffic management system.

Figure 1D:
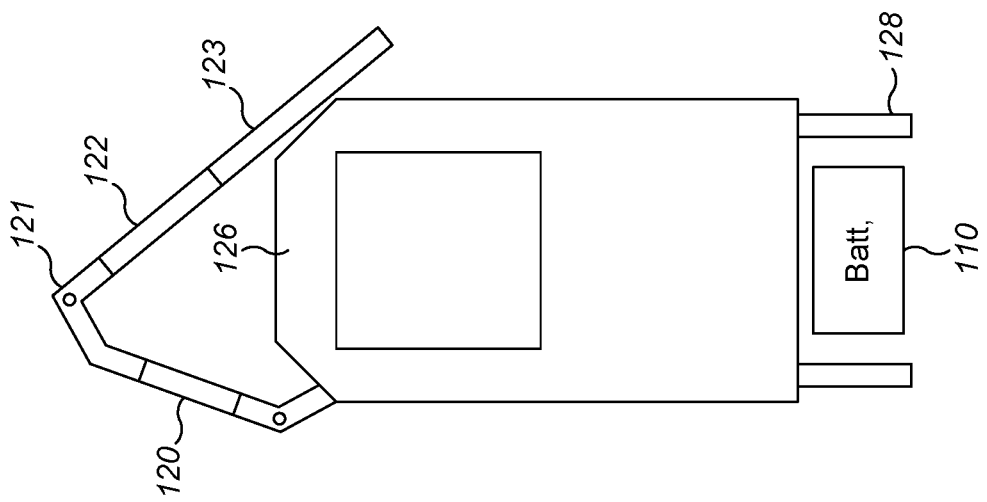

Other features will be apparent from the accompanying drawings and from the detailed description that follows.

DETAILED DESCRIPTION

This application addresses a severe deficiency for controlling traffic congestion and inefficient road management system. This disclosure enables the road ways, vehicles and the urban transportation system to be integrated and managed efficiently. A traffic management system for a modified space and energy transportation management is being described. The system comprises of a specific vehicle, a dedicated lane designed for the purpose and also a traffic management system. A uniform speed vehicle to follow a traffic management system that controls the flow of traffic to travel from one point to another and to arrive at a specific location on a given time estimated and projected by the system is described. Every vehicle operates at uniform speed hence termed one speed vehicle. The speed is adjusted by the system to manage the traffic during commute times and heavy traffic durations and reduce traffic congestion and accidents. The uniform speed helps in many matters such as saving fuel, controlling entry and exit from arterial roads to highways and vice versa, traffic light management and ability to predict an exact arrival time to a particular destination. A vehicle may be defined as a modified vehicle, car, van, truck or any motorized vehicle that uses road for transportation.

FIG. 1A shows a vehicle that can also be described as one speed vehicle. This is a light weight vehicle that contains modular sections that can be joined together to create the vehicle. The vehicle can be a single passenger vehicle or multiple passenger vehicles. A motive power and luggage module 102 provides extra space for luggage. Single passenger module 108 in a modular form is attached to the drive train 102 and the front control module 110. The passenger module has a window 104. Each passenger module 108 has individual climate control unit 114, a chair 118 and a communication device such as a computer panel or tablet 106 connected to internet. The front control module 110 contains vehicle steering mechanism, driver seat and computerized vehicle controls 112. The vehicle comprises of a special design wheels 116.

Figure 1C:
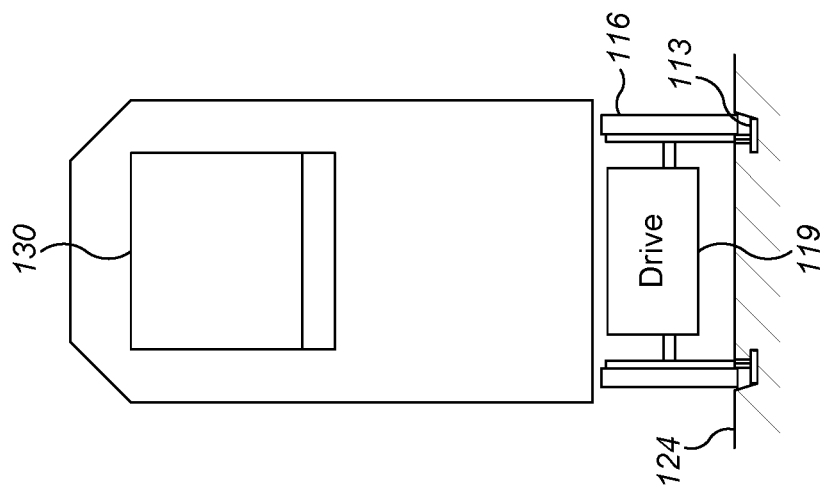
Figure 1B:
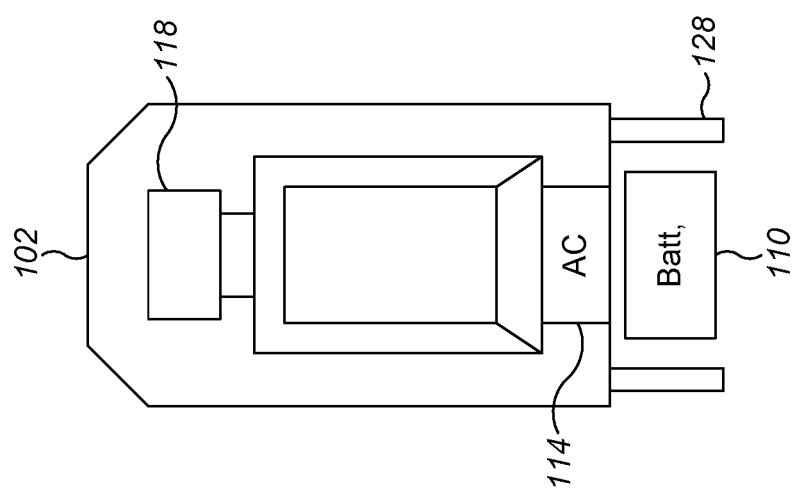

FIGS. 1B, 1C and 1D shows a different perspective of the specific vehicle. The wheels can operate on narrow gauge rail 113, or on conventional road. The passenger door has a skylight 120 and an up swinging folding door with door hinge 121, door window 122 and door section 123. The roof section 126 is closed using the door. The exit and entry can be easily done using the said foldable door design and not take too much space. Part 124 is asphalt that has rails 113. If the vehicle runs on electric grid then it has a drive train 119, and it has a battery 110. Part 130 shows a window in between passengers in FIG. 1C. The floor of the vehicle is supported by truss (or beam) 128.

Figure 2A:
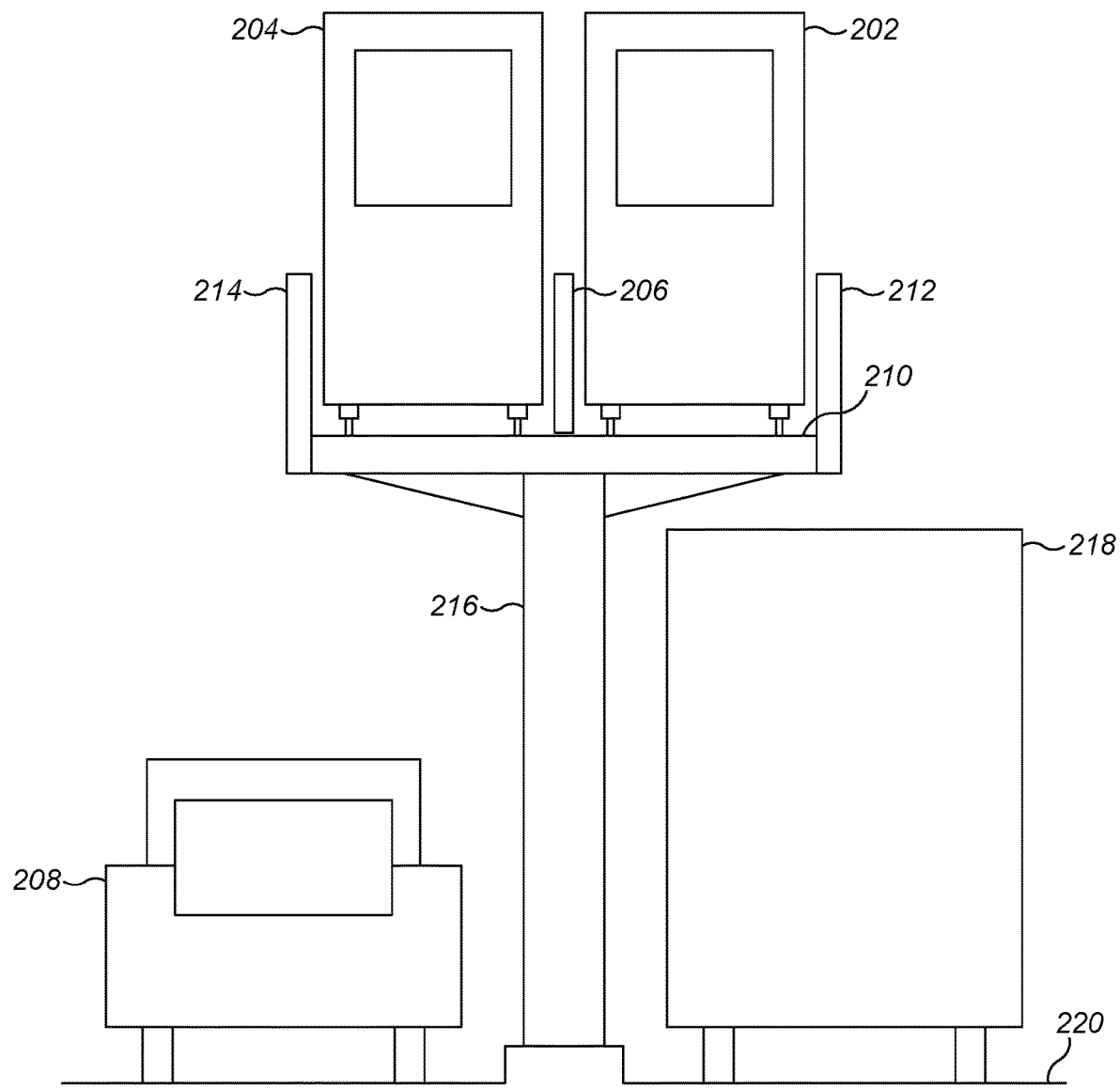
FIGS. 2A and 2B shows various lane configuration to be used in the transportation system.
Figure 2B:
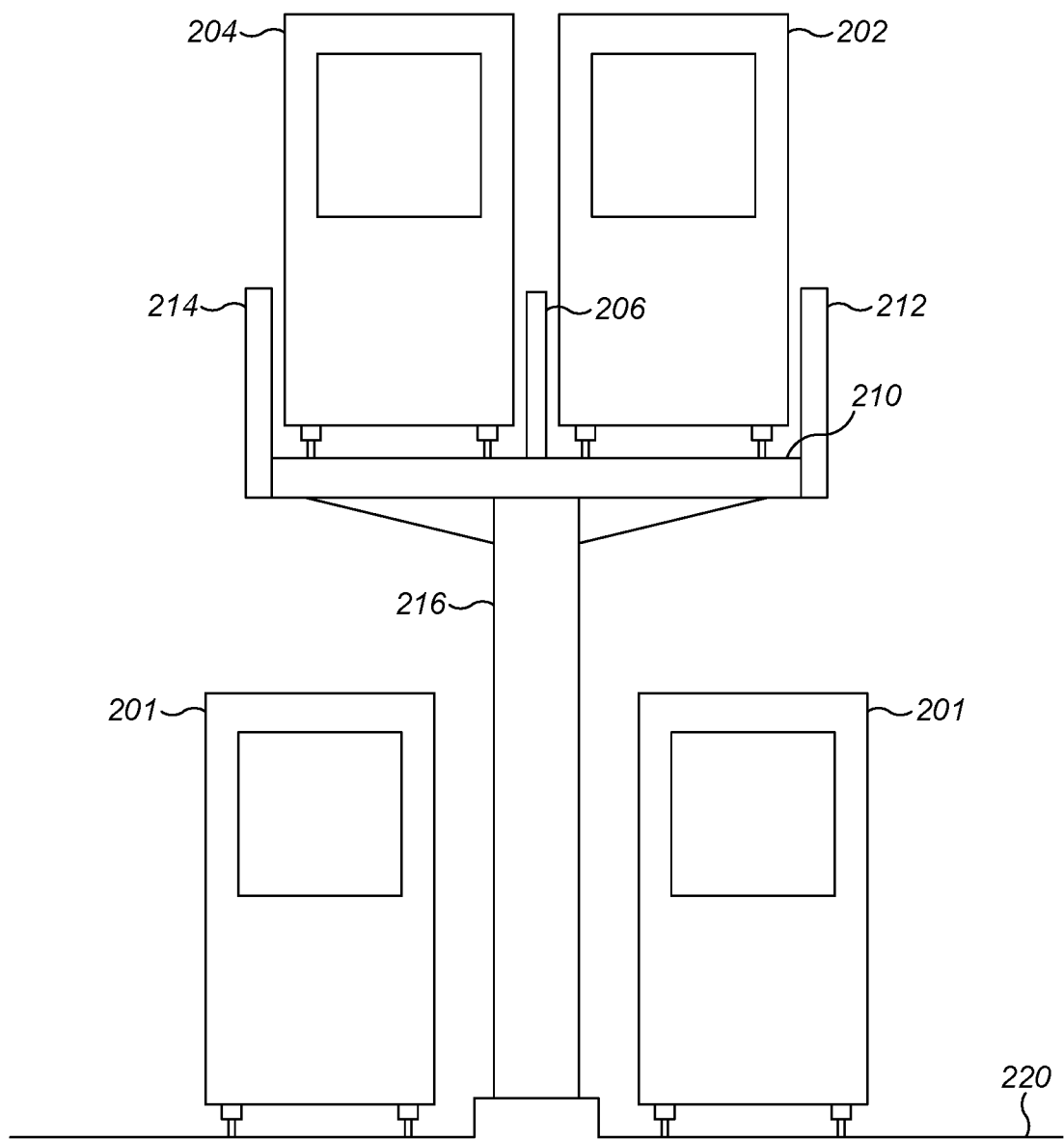

FIGS. 2A and 2B shows different configurations of the specific vehicle 201,202 and 204 that can be accommodated on the road by designing the roads in such a way that if necessary and the traffic is high, a two lane can be converted to four lane high way. The two ground level 220 vehicles 208 and 216 may be placed at upper level platform 210. A pillar 216 containing the upper level platform 210 that has security walls 214, 206 and 212 is created to accommodate two vehicles 204 and 202. The structure 210, 216 is level, ascending or descending.

Figure 3A:
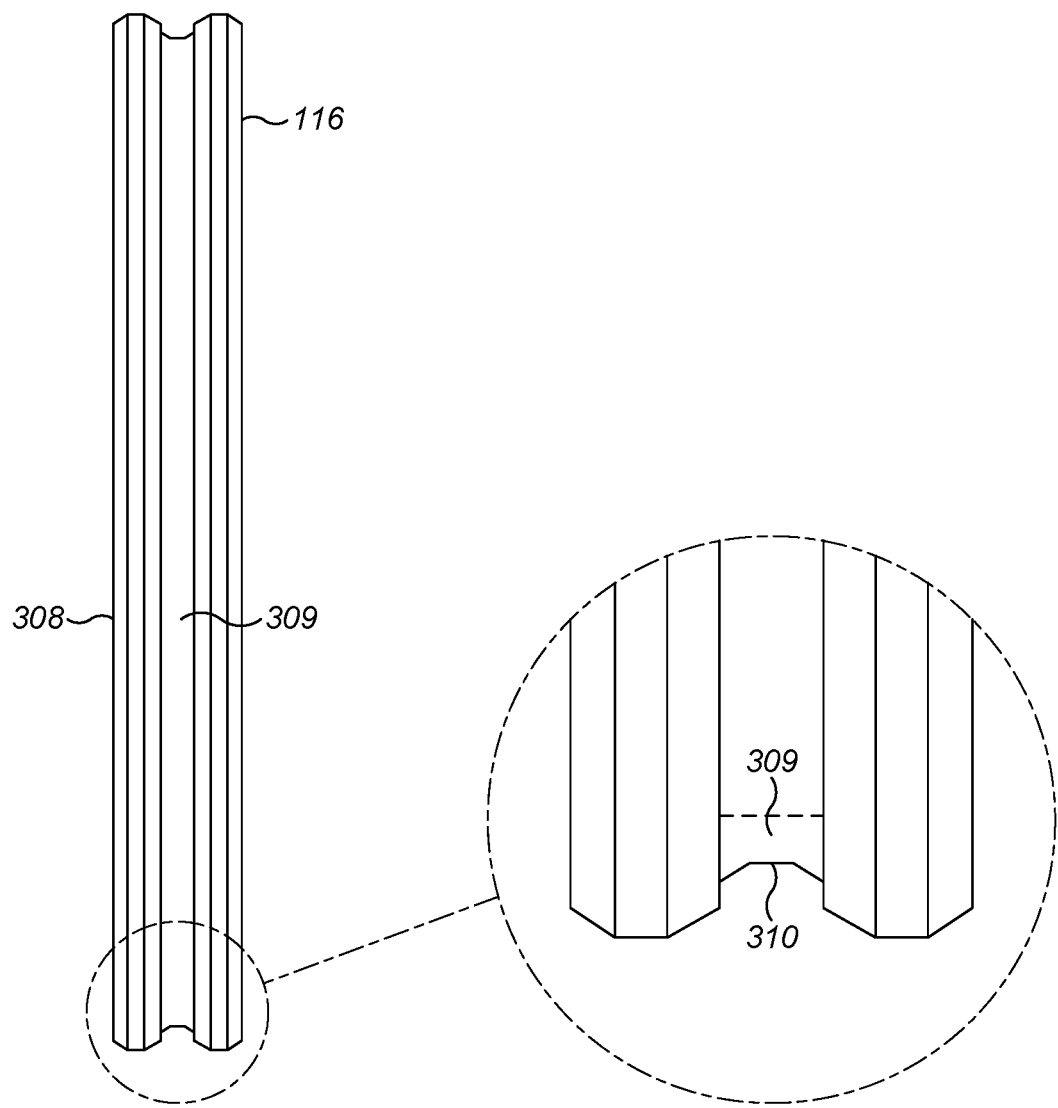
FIGS. 3A and 3B shows the modified wheel design for the vehicle, in one embodiment.
Figure 3B:
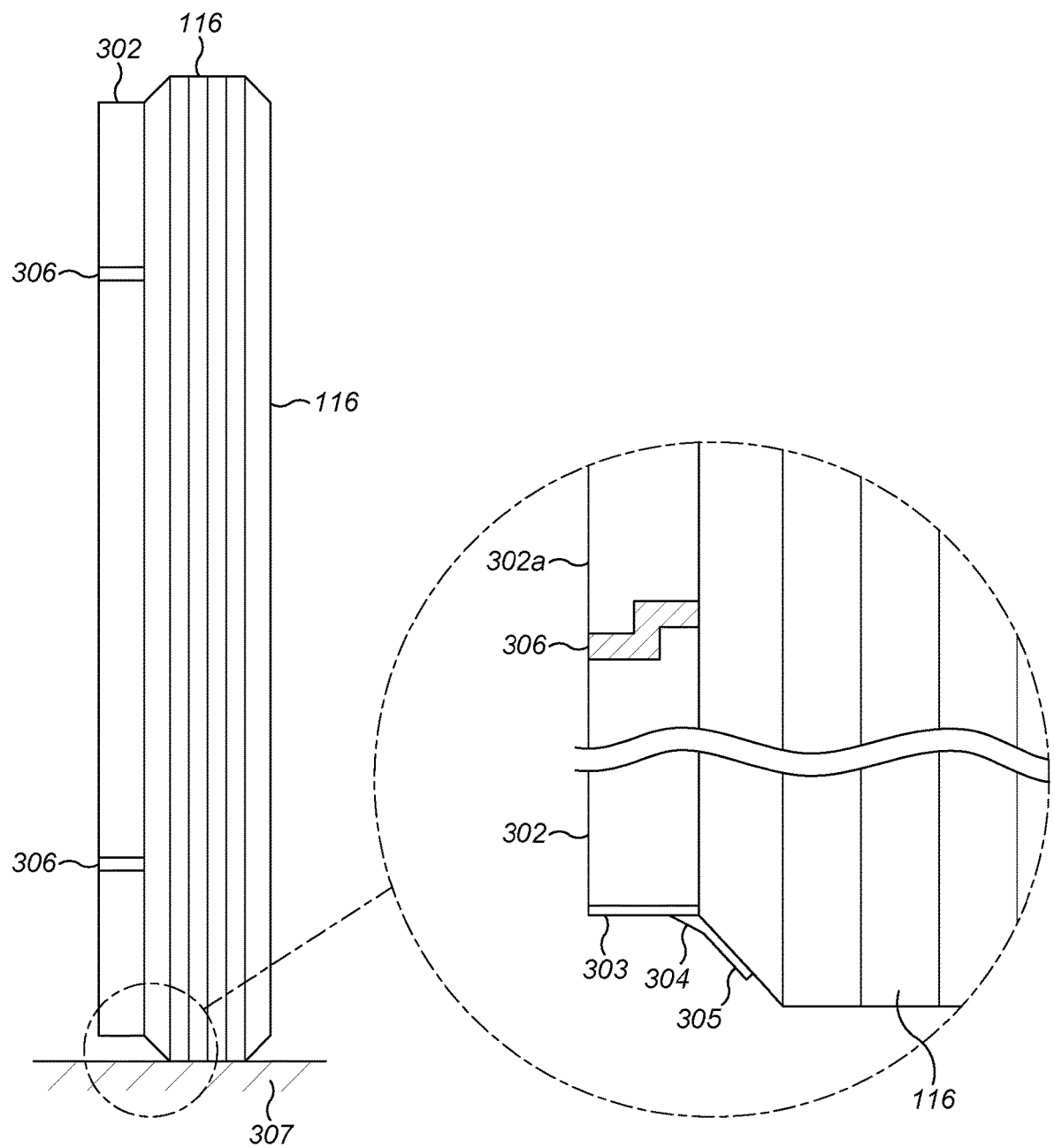

FIG. 3A shows the modified wheel 116 design having two parts. The two parts are the outer ring of the wheel 308 which is integrated with a smaller diameter center ring 309. The outer ring 308 is made up of conventional tire material and is softer. The center ring 309 is made up of conductive material to facilitate an electrical contact with the electrically conductive rail. The expanded picture shows that part 309 is the hard material and 310 is the part that comes in contact with the electric rail. FIG. 3b shows yet another embodiment of the modified tire design 116. The hard material 302 is on one side of the modified tire 116. The hard material transition 302 has a highly conductive material 303. The sidewall friction between rail and the modified wheel is minimized by using a hard and slippery material to transition 304 and 305. The exploded view shows that rail wheel electrically conductive material has an electrically isolating insert 306 separating the energy transmitting portion of the rail wheel from the axle and body of the vehicle 302a and 302. The modified wheel 116 is shown to operate on a conventional roadway surface 307. In one embodiment, the dedicated lane has a rail for the hard material of the tire to get in contact with the rail. The dedicated lane also has an indentation to accommodate the steering by the soft portion of the tire at the entry/exit areas of the dedicated rail equipped lane and enables transition at high speed.

Figure 4A:
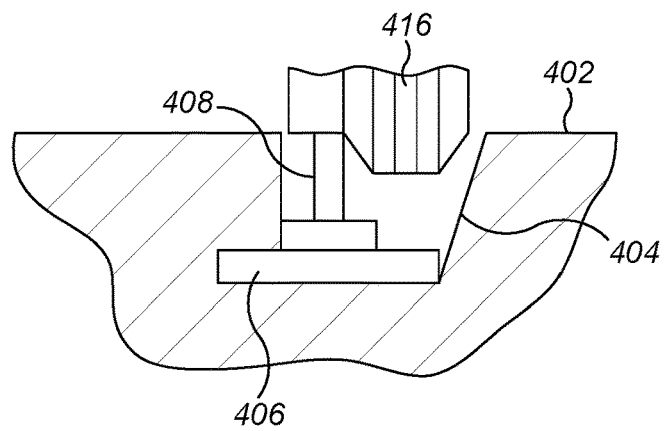
FIGS. 4A, 4B, 4C, 4D, 4E and 4F show the modified wheel design for the vehicle and road design to accommodate the vehicle in one embodiment.
Figure 4B:
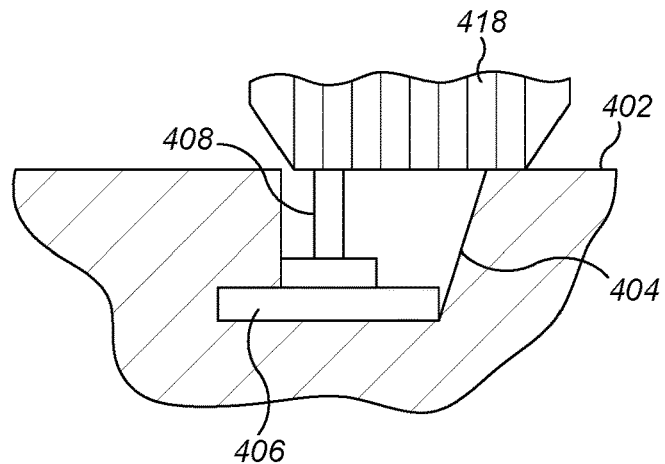
Figure 4C:
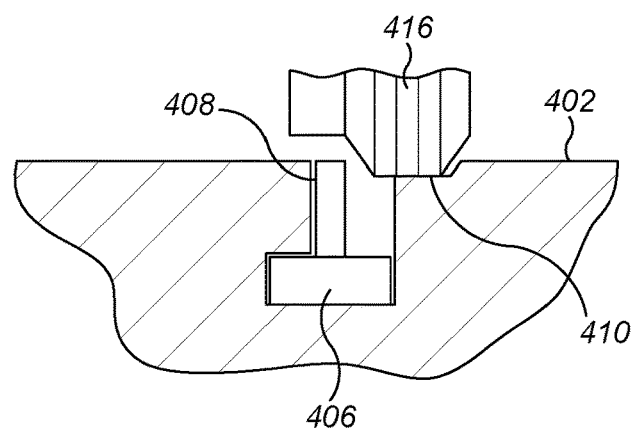
Figure 4D:
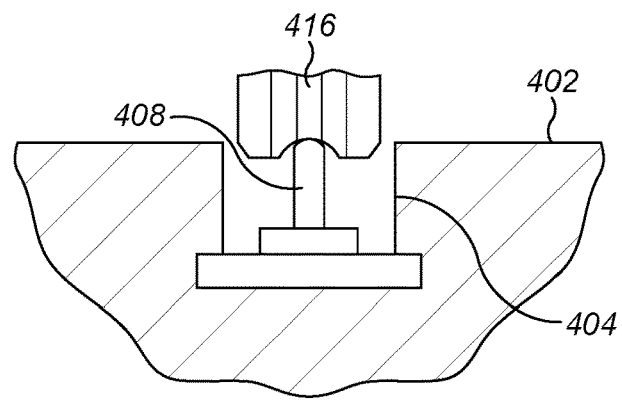
Figure 4E:
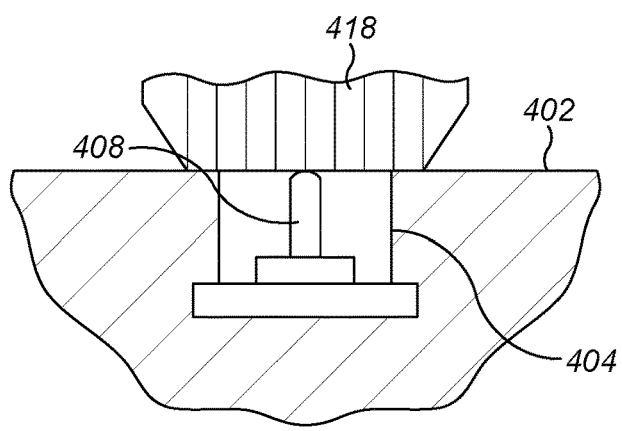
Figure 4F:
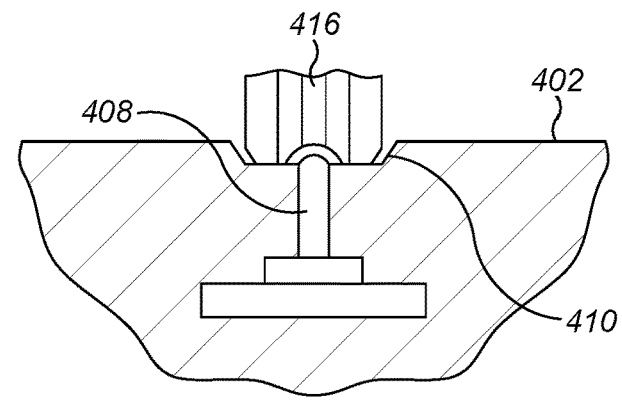

FIGS. 4a, 4b, 4c, 4d, 4e, and 4f shows various configurations of dedicated lane modified surface verses electric rails to accommodate different modified tire design. The configurations also accommodate the road design and lane changes that need to be implemented. The design also accommodates non rail conventional tire design to run on designated lane. The vehicles with conventional tires may be controlled by the traffic management system, in one embodiment. The road surface 402 is common in all FIG. 4 variations. FIGS. 4a and 4b show the electric high power conductor 406 embedded into the depression of the road surface 402. Various tires such as 416 in all FIG. 4 (a, b, c, d, e and f) show that either they run on the rails or simply over the rails depending on the modified tire design. The subsurface or trench 404 accommodates all the inserts of the rails on road surface 402. The electric rail 408 connects electric high power conductor 406 to the modified tire 416. In FIG. 4c a small dip in the road surface 410 is shown to accommodate modified tire while the side electric metal piece is lifted from the electric rail. FIGS. 4b and 4e show conventional tire 418 being run over modified dedicated lane. FIG. 4f shows modified wheel design of FIG. 3a being raised from modified dedicated lane by indentation 410. The dedicated lane indentation 410 steers the soft portion of the tire 416 at high speed transition between lanes.

Figure 5A:
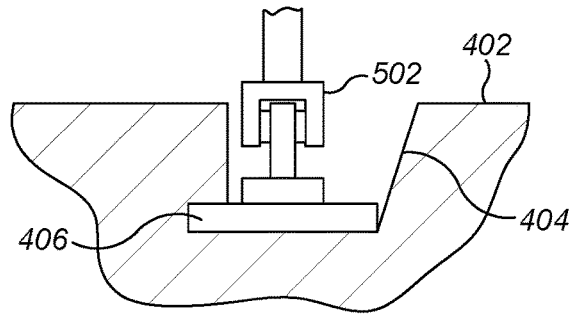
FIGS. 5A, 5B, 5C and 5D shows the details of the emergency rail brake system.
Figure 5B:
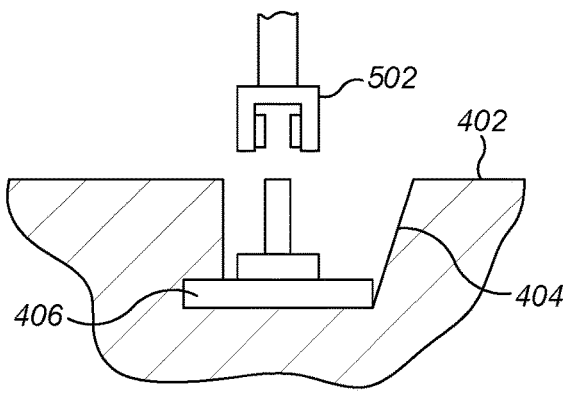
Figure 5C:
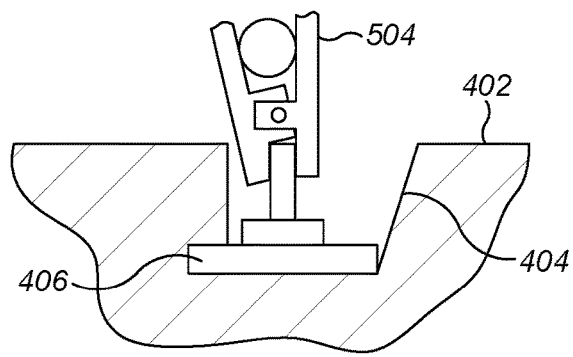
Figure 5D:
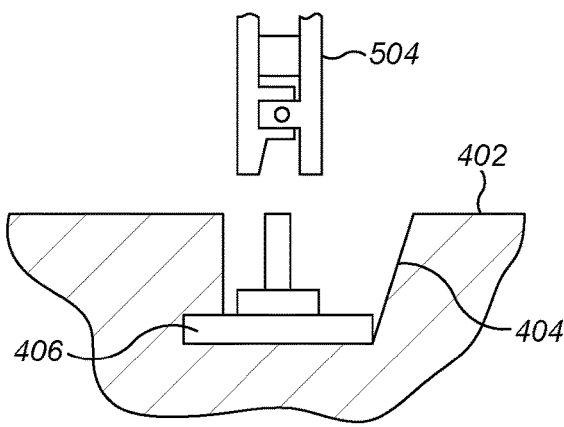
Figure 6A:
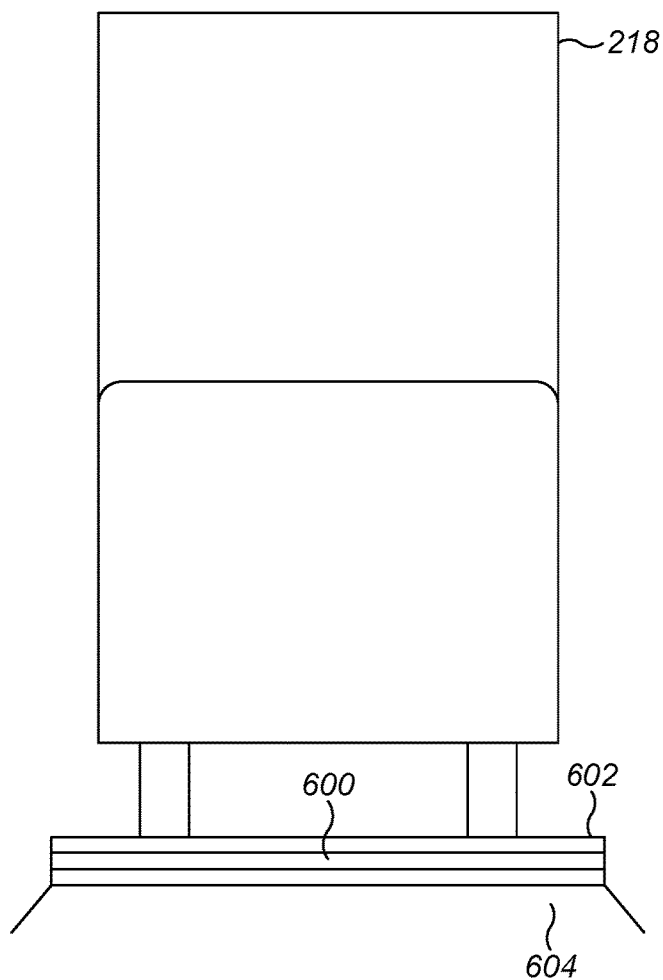
FIGS. 6A and 6B, compares the size of the conventional vs instantly claimed lane infrastructure.
Figure 6B:
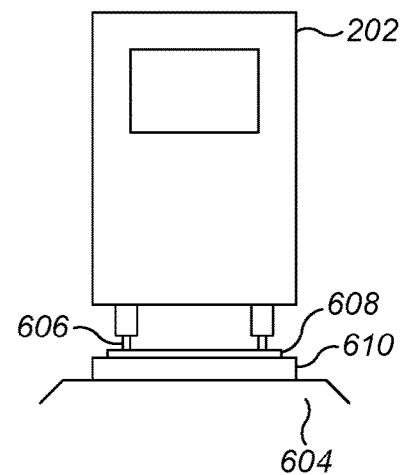

FIGS. 5a, 5b, 5c and 5d show emergency brake system for different configuration of the modified tire design and vehicle design. FIG. 5a shows emergency rail brake 502 in fully clamped position. This feature in the vehicle can be lowered when required. FIG. 5b shows a disengaged position of the same brake as shown in FIG. 5a. FIG. 5c shows a scissor type 504 of emergency brake system in clamped position. Both brake systems are either combined with conventional brake system or alone. FIG. 5d shows disengaged brake system 504 for the scissor type of emergency brake system. FIGS. 6a and 6b shows in scale the amount of material needed to construct one traffic lane (soil base 604) of conventional design versus the novel transportation infrastructure. In conventional roadway several layers of concrete or black top 600 and 602 are layered on top of each other after leveling the soil base (604). In another embodiment, the novel infrastructure a crushed rock blast 610 over soil base 604. The rail 606 sits on a layer of firm concrete or wooden tie 608. Vehicle 218 uses conventionally structured roadway and vehicle 202 uses rail based roadway.

Figure 7:
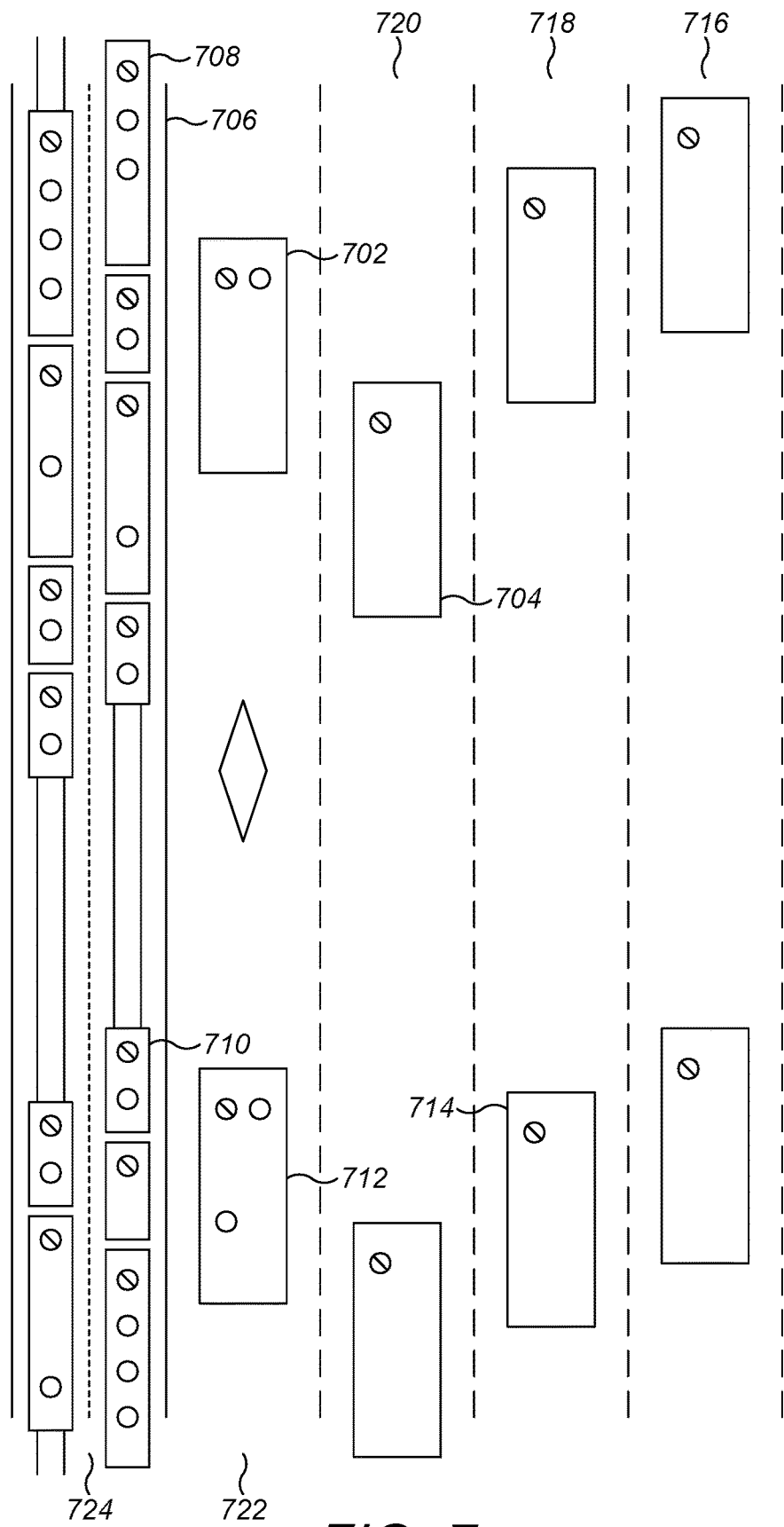
FIG. 7 shows an aerial view of a typical highway with a dedicated lane for the transportation system, in one embodiment.

FIG. 7 shows the present highway design implemented with two modified dedicated lanes 724 that are speed controlled. The specific vehicle 708 and 710 show the occupancy rate of multiple riders. The driver and passenger total is much more in this lane compared to lanes such as high occupancy vehicle (HOV) lane 722 and normal driving lane 720, 718 and 716. These lanes 720, 718, 716 and 722 show normal vehicles with normal distance apart as 712 and 702, 704 and 714. The specific dedicated lane modified is separated by a barrier 706. The dedicated lane modified provides benefit in carrying more riders in the same length compared to HOV and regular lanes. For example, the regular lanes cars have to maintain a specific distance according to good driving practice and car manufacturers depending on their speed hence reducing number of vehicles in a specific space. In the HOV lane the car carries either two or three riders and still has to maintain the car distance, so the ridership is slightly more than the regular lanes. However, in the dedicated lane modified the specific vehicle is controlled by traffic management system and one speed is maintained hence there is no need for them to maintain so much distance as they all travel at the same speed and carry more (difference is 30 riders in the same space) in the same geographical distance and lane distance compared to 5 in HOV lane and 2 people in regular lane.

Figure 8A:
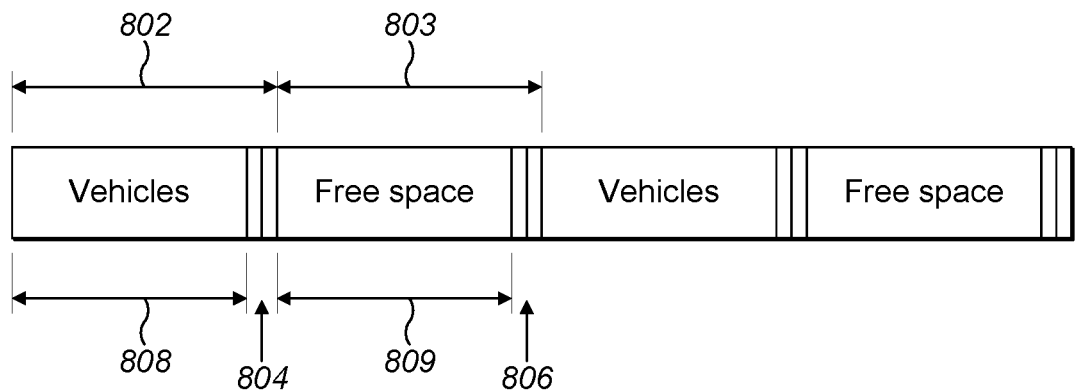
FIGS. 8A and 8B shows a special arrangement for vehicles to be used in the one speed transportation system.
Figure 8B:
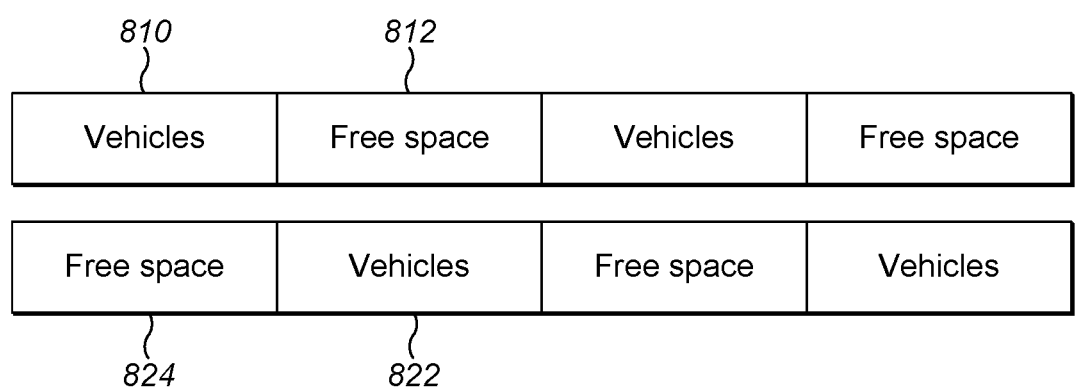

FIG. 8*a* shows the whole length of transportation artery is divided into time slots 802 and 803, progressing in time along the route at assigned one speed. The time slot 802 is reserved for vehicles and time slot 803 is reserved for the safety empty space (free space). The beginning of each time period 802 is the time reference point for the GPS location of the lead vehicle of an assembled vehicle train. The beginning of time slot 803 period is the GPS time reference point of the beginning of safety empty space. The time period 808 represent the maximum length of train of vehicles. The time period 809 represents the minimum time of empty safety space. The variable time 804 accommodates the extended length of the vehicle train during vehicle entry, transition to next lane, or exit. The minimum space in front and behind the vehicle entering or exiting the lane is increased during the lane change maneuver for increased safety reasons. The variable time 806 represents the reduction in safety empty space during a vehicle entering the lane before joining and becoming part of the vehicle train ahead of it. It also represents intrusion of safety empty space by vehicle leaving the train in front of the safety empty space. FIG. 8*b* shows the time slot offset between two modified traffic lanes. Vehicles 810 operate next to neighboring lane free space 824. Vehicles 822 operate next to free space 812. The offset is necessary to accommodate exchange of vehicles between lanes.

Figure 9:
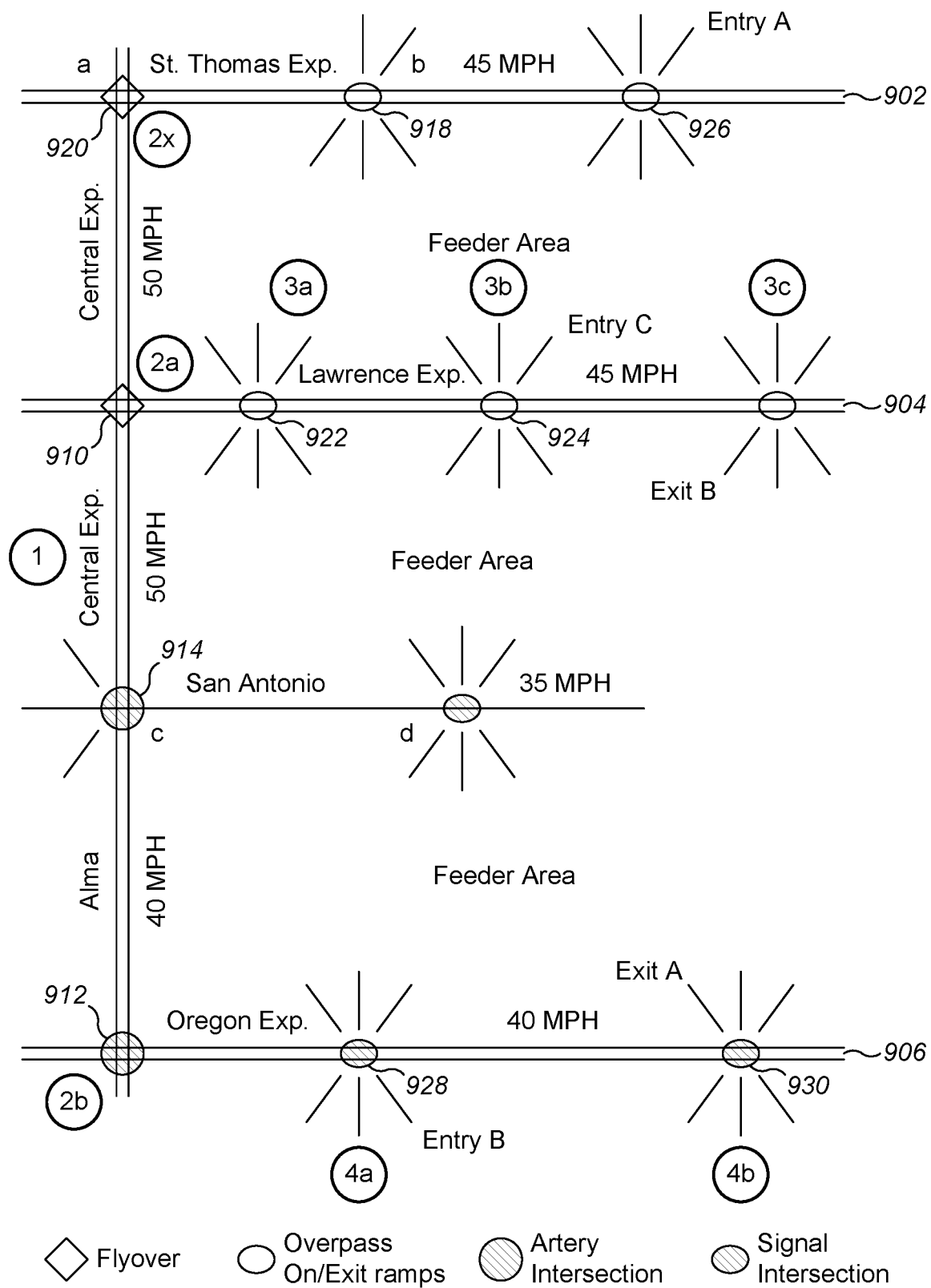
FIG. 9 shows example of a transportation system entry point and exit for vehicles from one arterial junction to a highway.

FIG. 9 shows an example of section of suburban transportation system. FIG. 9 also shows the actual method of using the traffic management system to control the specific vehicle and dedicated lane modified from normal road. More specifically it shows an example in Santa Clara county. The road design consists of perpendicular arterial roads as arteries. Since the map is published and the traffic lights distances are captured, the traffic management system controls the traffic flow and speed of the specific vehicle. Specific vehicle enters A on St. Thomas expressway 902 at intersection 926 at 45 mph speed and passes overpass 918. The specific vehicle also is powered by the rail on the dedicated lane modified powered rail. In order to enter central expressway at an overpass "a" 920 and accelerates to 50 mph. The vehicle transits Central Expressway (1) and during transition overpass 912 (2b) slows down to 40 mph and after proceeding on Oregon expressway exits at intersection 930 towards exit "A". The specific vehicle may travel between 45-70 mph and is made up of fiberglass or light weight material such as Aluminum. The vehicle charges at current between 100-150 Amps at 50-70 volts which are not lethal power and is safe. The wattage is between 5000-10500 Watts. The acceleration of the specific vehicle to a highway from the artery road is between 1-10 mph. The traffic management system controls the speed at a sustained speed and during acceleration and deceleration. The traffic management system may remotely control the steering during lane transition. The feeder areas are typically side roads that merge into highway or main road. In this example St. Thomas express way, Lawrence express way, San Antonio road, and Oregon express way are shown to lead to central express way. Each feeder road (area) has traffic lights, intersections and over passes that connect them to various other arterial roads. The speed limits are different and range from 40-50 mph. Lawrence express way (904) for example has three overpasses 3a, 3b and 3c that lead to arterial roads 922 and 924 and has an overpass connection 910 with 2a section controlling inflow. The exit and entry points are controlled by the traffic management system which will be discussed with FIG. 12. San Antonio road has two lights c and d. The overpass 914 allows entry and exit from central express way 1. Oregon express way 906 has separate exit and entry points such as exit A 930 and entry way 912, 928 and 930. The speed limit is different and is at 40 mph. The lights 4a and 4b and 2b control and help traffic flow as well. An example map in FIG. 9 shows the most congested area is one speed segment 1. Its throughput flow is a product of speed, vehicle space and open safety space. This segment flow is divided by the inflow from preceding exchanges 2a and 2x. The inflow at exchange 2a is divided and allocated to on ramps 3a, 3b and 3c. At no time the inflow into segment 1 exceeds its capacity, so traffic proceeds at full segment speed. None of the segments between on ramp 3c and full capacity segment 1 are congested and flow freely. Downstream from segment 1 the traffic flow is gradually decreased at each exit point 2b, 4a, 4b. In opposite direction another vehicle enters at Entry B 928 and travels toward Exit B (3c).

Figure 10:
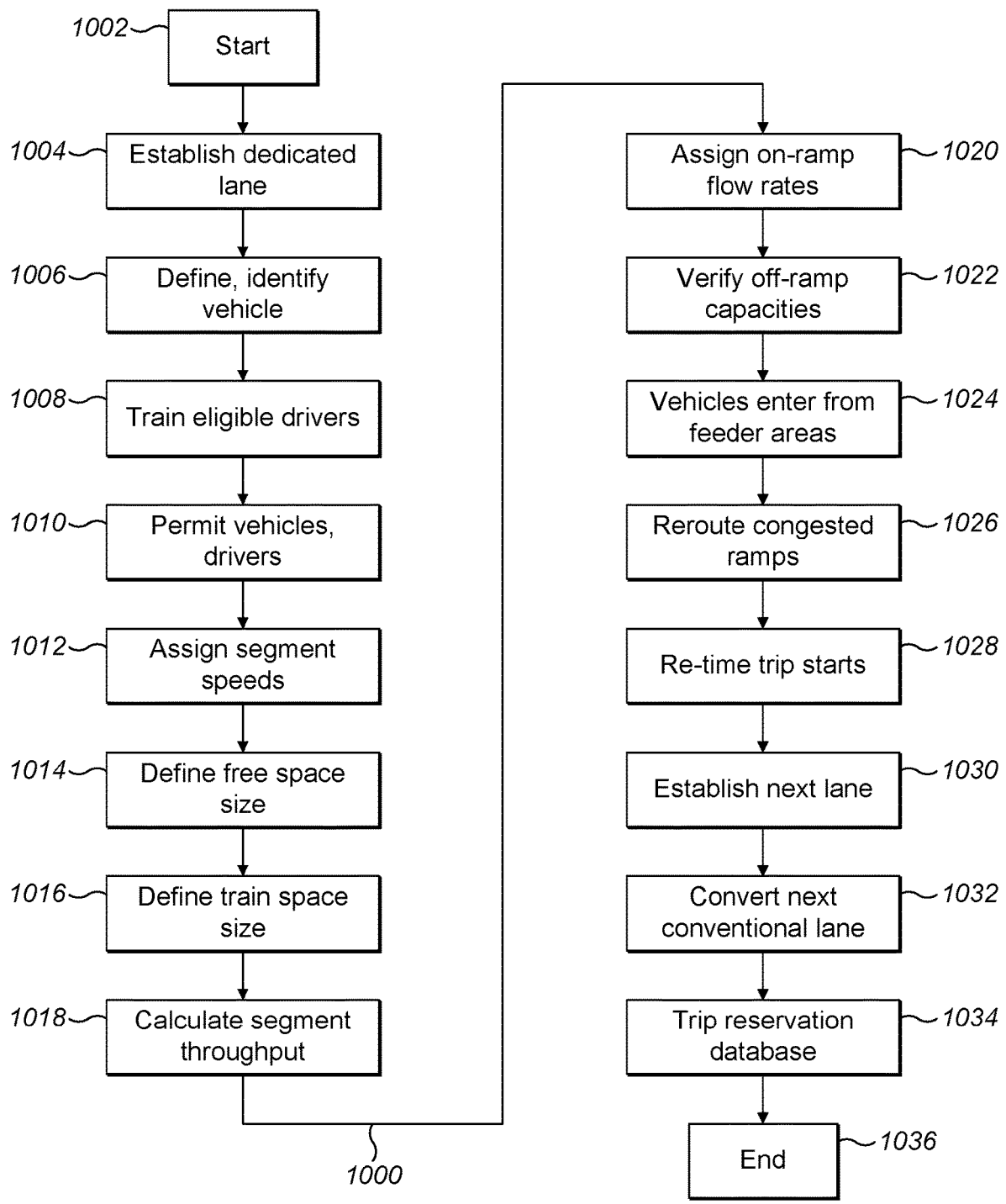
FIG. 10 shows the flow chart for traffic transportation system.

FIG. 10 shows the transportation system for urban traffic flow chart. This flow chart is unidirectional with strict rules to follow. Starting point 1002 leads to establishing a dedicated lane 1004 by the transportation authorities and change the road structure to accommodate specific vehicle. The specific vehicles need to be identified 1006. The specific vehicle has particular knowledge for operation hence training of the eligible driver need to be set up 1008. The system and authorities would give permits to the vehicles and the drivers to use the dedicated lane modified and specific vehicle 1010. The traffic management system would assign segment speeds 1012 for each section of the highway and arterial roads. The novel method of defining the free space size 1014 for creating a safe and optimal distance to maximize traffic flow is done as a next stage. There are many configurations of the said specific vehicle. If individual rider or commuter is using the lane then it is a single unit, but if multiple commuters are going to take the same route and to optimize commute time and traffic congestion then the several units of the specific vehicle are assembled as a train or joined vehicle and those spaces between two trains have to be defined 1016. Once the modified dedicated lane is in use a segment throughput calculation needs to be made 1018 to optimize traffic flow and give the best timing for each commuter destination. The decision flow 1000 is now assigning on ramp flow rate 1020 and verifying off-ramp capacities 1022. Conventionally driven vehicles enter express system from feeder areas at on-ramps 1024. During peak commute time the off ramps and on ramps may get congested and the traffic management system has to manage the traffic by rerouting congested ramps 1026. Another way to control the traffic would be to manage the start time of the trips by the specific vehicles 1028. If one lane reaches full capacity the traffic management module and transportation system enables the authorities to establish another lane 1030 to accommodate additional commute traffic. Next, convert a conventional traffic lane to modified dedicated one 1032. All this data is stored and used by trip reservation database 1034 to allow rider/commuters to make reservation by observing real time change in commute time and optimal time prediction for reaching a destination. The process ends 1036 for one way flow.

Figure 11:
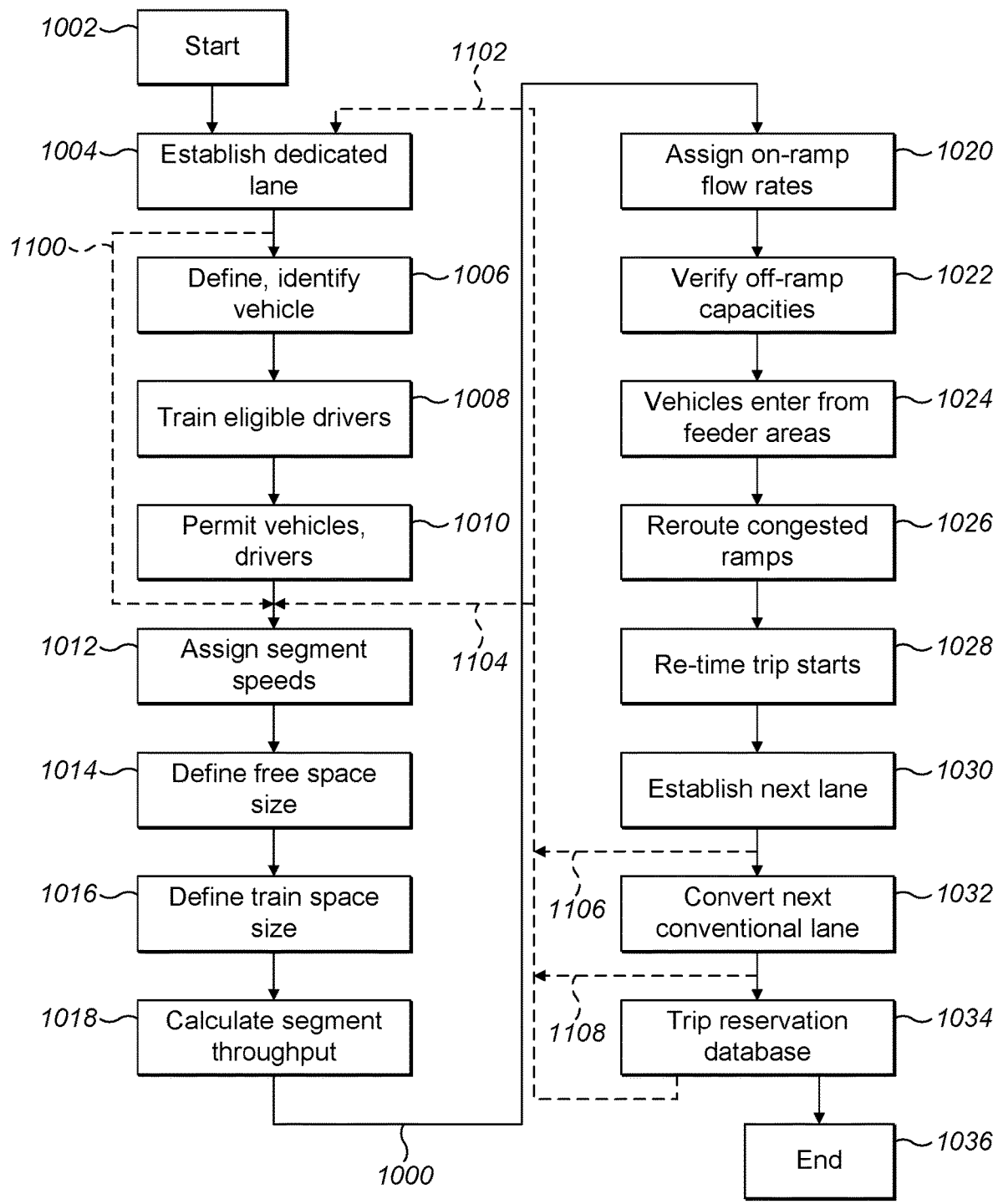
FIG. 11 shows the transportation flow chart with different decision options for traffic transportation system.

FIG. 11 shows multiple iterations of flow management process in FIG. 10. However, there are some variations as far as decisions are concerned for real time adjustments. Steps 1006-1010 can be bypassed 1100 if sufficient qualified vehicles and drivers are available. The trip reservation database 1034 can also feed data for assigning segment speed via flow 1104 or establish dedicated lane 1102. Establishing a dedicated lane 1004 can happen after establishing the next lane 1106 and/or starting ½ width conversion of a newly converted lane 1108. Every decision is made to maximize traffic control by transportation management system.

Figure 12:
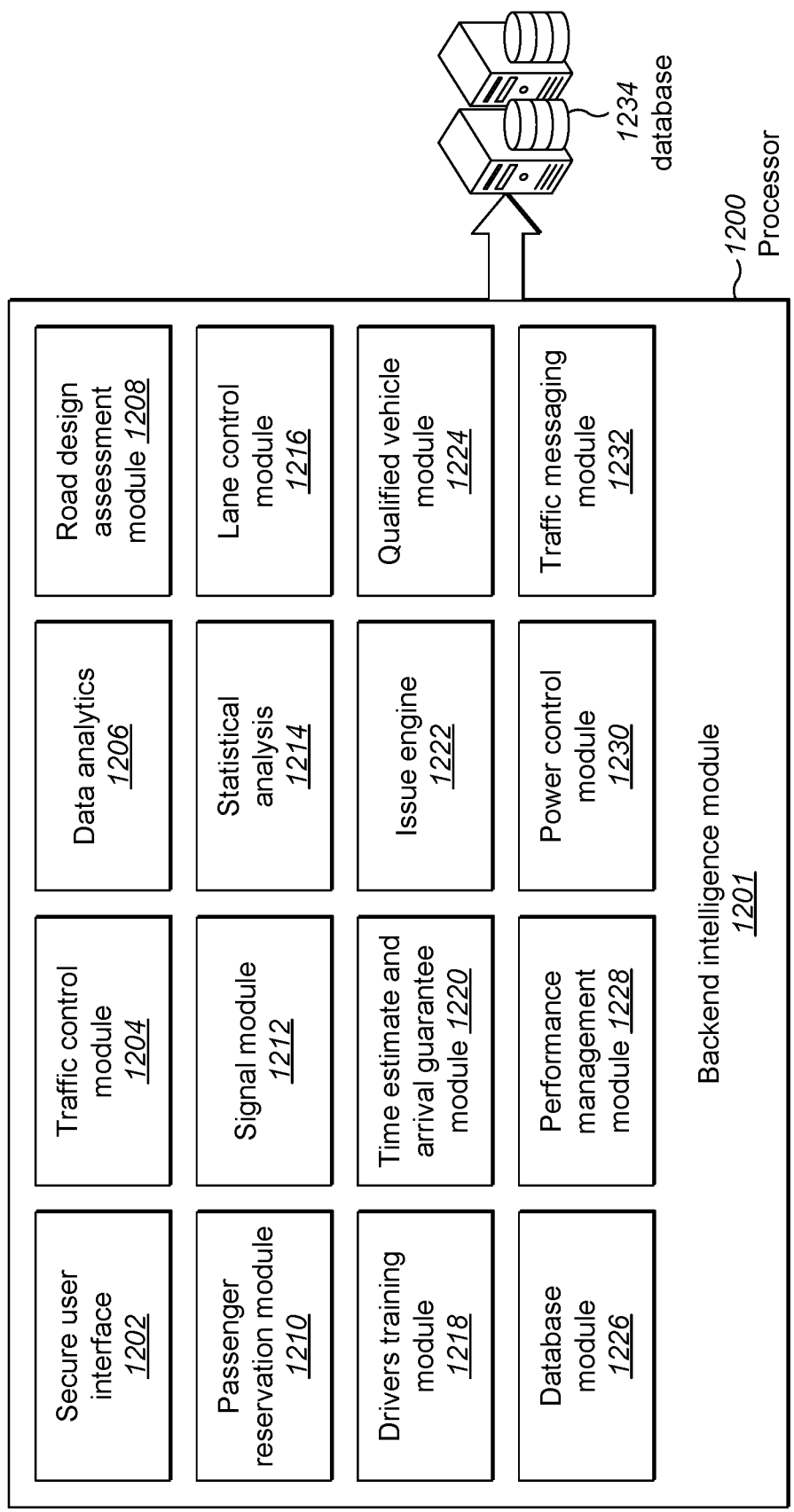
FIG. 12 shows the various modules residing in a processor for the transportation system.

FIG. 12 shows the backend intelligence module 1201 on a processor 1200 for the system and method for a modified space and energy transportation management system with data being stored and retrieved in database 1234. Individual modules of the back end intelligence module in combination help run the traffic management system. The traffic management system comprises of a secure user interface 1202, traffic control module 1204, data analytics 1206, road design assessment module 1208, passenger reservation module 1210, signal module 1212, statistical analysis 1214, lane control module 1216, drivers training module 1218, time estimate and arrival guarantee module 1220, issue engine 1222, qualified vehicle module 1224, database module 1226, performance management module 1228, power control module 1230 and traffic messaging module 1232. A method and system of using a modified space and energy transportation system enables saving energy in terms of fuel and/or electricity consumption. Most relevantly it reduces the commute time for the riders and enables the system to predict accurate travel time by time estimate and arrival guarantee module 1220 managing the traffic and reducing congestion. The secure user interface 1202 helps commuter 1336 to access the common access point 1314 data for making reservations, using public internet access as passenger 1316. The drivers use drivers training module 1218 in FIG. 12 for getting trained as eligible drivers 1008, obtaining permit for vehicles 1010 and obtain eligible driver license.

The traffic control module 1204 calculates a traffic pattern based on a route, time and geo positional information to regulate the traffic from an arterial road to highway and from highway to arterial road. Each specific vehicle when they start they are assigned a lane by the lane control module 1216 based on the road design assessment module that shares information to the backend intelligence module 1201 to give information about the road design and then lane is determined to be allocated. These distances are differently assessed because conventional vehicle use lane detection sensors and front and back sensors. Since the specific vehicle travel at a uniform speed and keep optimal distance from each other the time estimate and arrival guarantee module 1220 can correctly predict the arrival and departure time for the rider/user when they are making reservations. Data Analytics 1206 calculates free space size 1014, define train space size 1016 and calculates segment throughput 1018 using several statistical calculations to predict time estimate and arrival guarantee. The statistical analysis also enables the traffic control module 1204 passenger reservation module 1210 to allocate extra trains that are made up of several specific vehicles joined together and/or increase number of lanes so more commuters/riders are accommodated. The destination is also optimized using statistical calculations so entry and exit of each vehicle from highway to arterial roads are optimized and other traffic lanes are not affected.

The road design assessment module 1208 regulates an inflow and out flow of the specific vehicle considering the movement of a vehicle in a normal lane. The qualified vehicle module 1224 enables entry of selected vehicles in to the express way system. Traffic messaging module 1232 gathers destination requests from passenger reservation module 1210, signal module 1212 and performance management module 1228 about the status of every special vehicle and train, their position their travel time and distance from pick up and drop off places to group the vehicles for a specific destination so that space and energy is saved. The issue engine 1222 issues vehicle and drive permits to be used in the dedicated lane.

The data analytics 1206 in conjunction with passenger reservation module 1210, traffic messaging module 1232 and performance management module 1228 allocates an optimum number of passengers at a specific time and a specific vehicle so the space, time and traffic are maintained at maximum capacity.

The traffic messaging module 1232 helps the driver, rider and the specific vehicle occupants to receive, send messages about status, confirmation of reservation and allocate the resources to manage the traffic management system. The issue engine 1222 may also record all the glitches, rides performed, lane changes, accidents, power supply, battery life of the specific vehicle for maintenance, ride sharing historical perspective and feed the results to database 1220. The stored data can then be used by data analytics 1206, road design assessment module 1208, statistical analysis 1214 or others.

Figure 13:
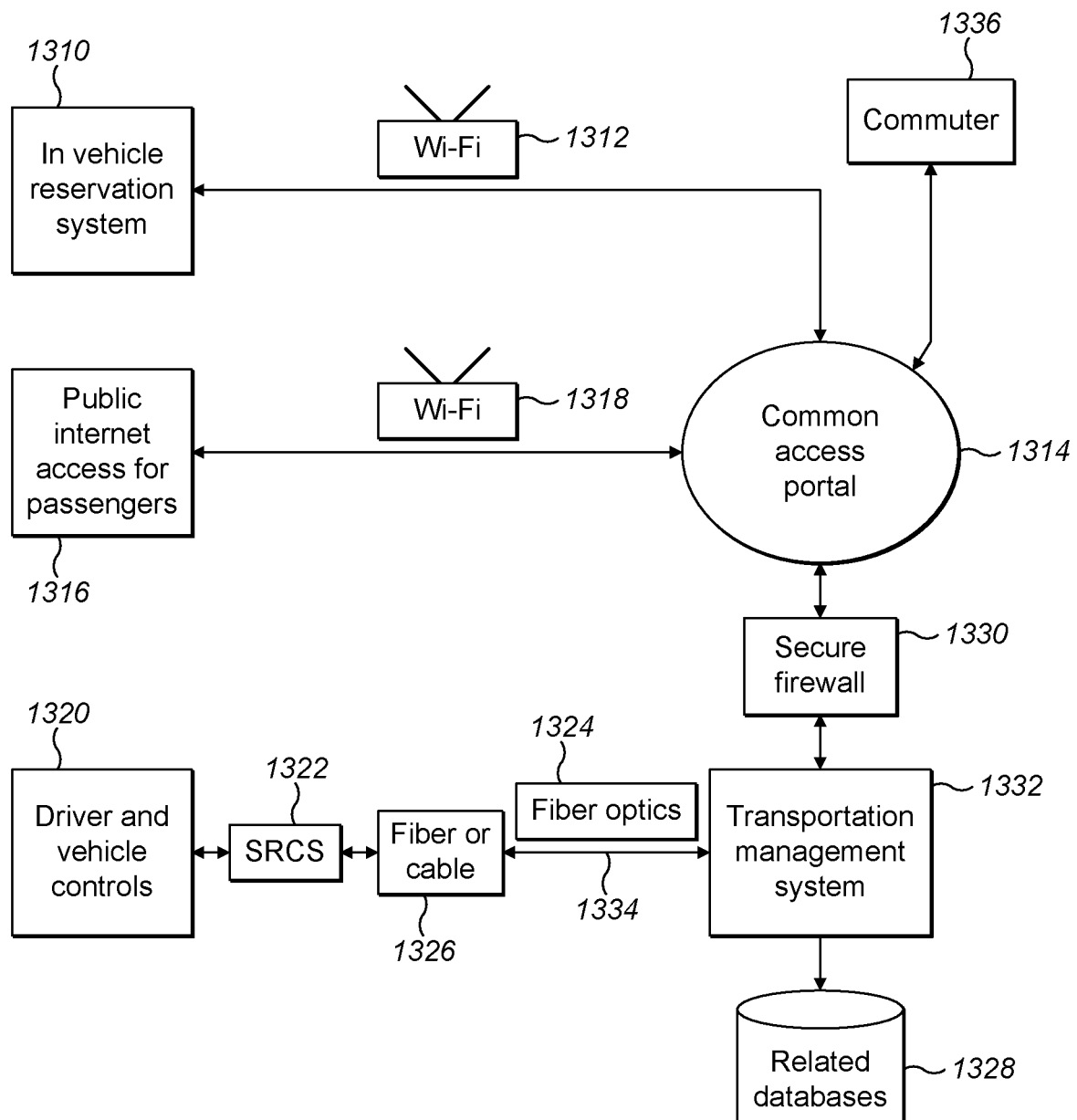
FIG. 13 shows transportation system architecture for an urban scenario.

FIG. 13 shows various ways for the commuter 1336, in vehicle reservation system 1310, public internet access for passengers 1316 to access the common access portal 1314 using the Wifi 1312, 1318. This communication is a two way contact system. It can be set up in a secure closed system using Wifi. The common access portal 1314 communicates with a secure firewall 1330 to connect to transportation management system 1332. The vehicle speed and steering is controlled by driver and or by remote vehicle control 1320 situated in box 112 is securely accomplished behind the fire wall. SRCS 1326 (short range communication system) is connected to fiber optics network 1324, fiber or cable 1326 using 1334 route. Wireless SRCS connection 1322 on (at) vehicle connects (or links) via 1334 by secure optical fiber 1326 to Transportation Management System. It is not just restricted to fiber optics and may be open to other connections after making sure the communication is secure. The transportation management system 1332 data is stored in related databases 1328. Commuter 1336 can also connect to common access portal 1334 via public or at home Internet connection.

Figure 14:
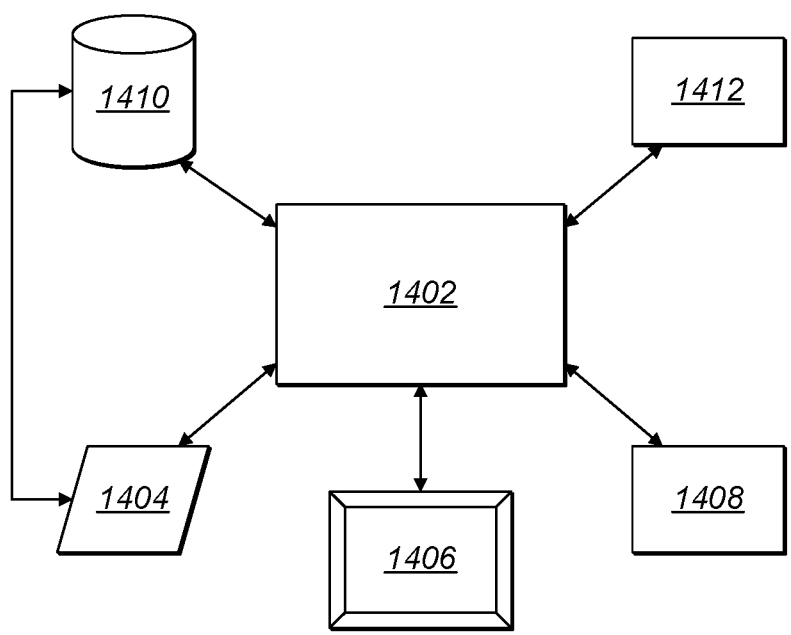
FIG. 14 shows the entire transportation system scheme for urban traffic.

FIG. 14 is a systematic view of an integrated system for traffic management illustrating communication between user and the server through a network, according to one embodiment. In one embodiment a user or multiple users may connect to the server that hosts the transportation management services in the system. In another embodiment, the user hardware such as a PDA, mobile device such as tablets, steering wheel of the specific vehicle, computer or a mobile phone or any wireless device. The network 1402 may be a LAN, WAN, mobile, telecommunications, internet, intranet, WiFi and/or ZigBee network, etc. The user/individual 1404, 1406 and 1408 and so on may be an individual, a rider, a driver, a controller of traffic, but not limited to these group of folks only. The user and individual are used interchangeably and mean the same. The user may be any person who accesses the traffic management system for various activities as discussed in different case scenarios in the supporting figures. The server 1412 may also be used for storing data and processing. The traffic management system 1410 may be accessed to search routes, enquire the ride share, use the content and save and/or delete the content. The server is dedicated and secured and may be stand alone, cloud based or hosted services.

Figure 15:
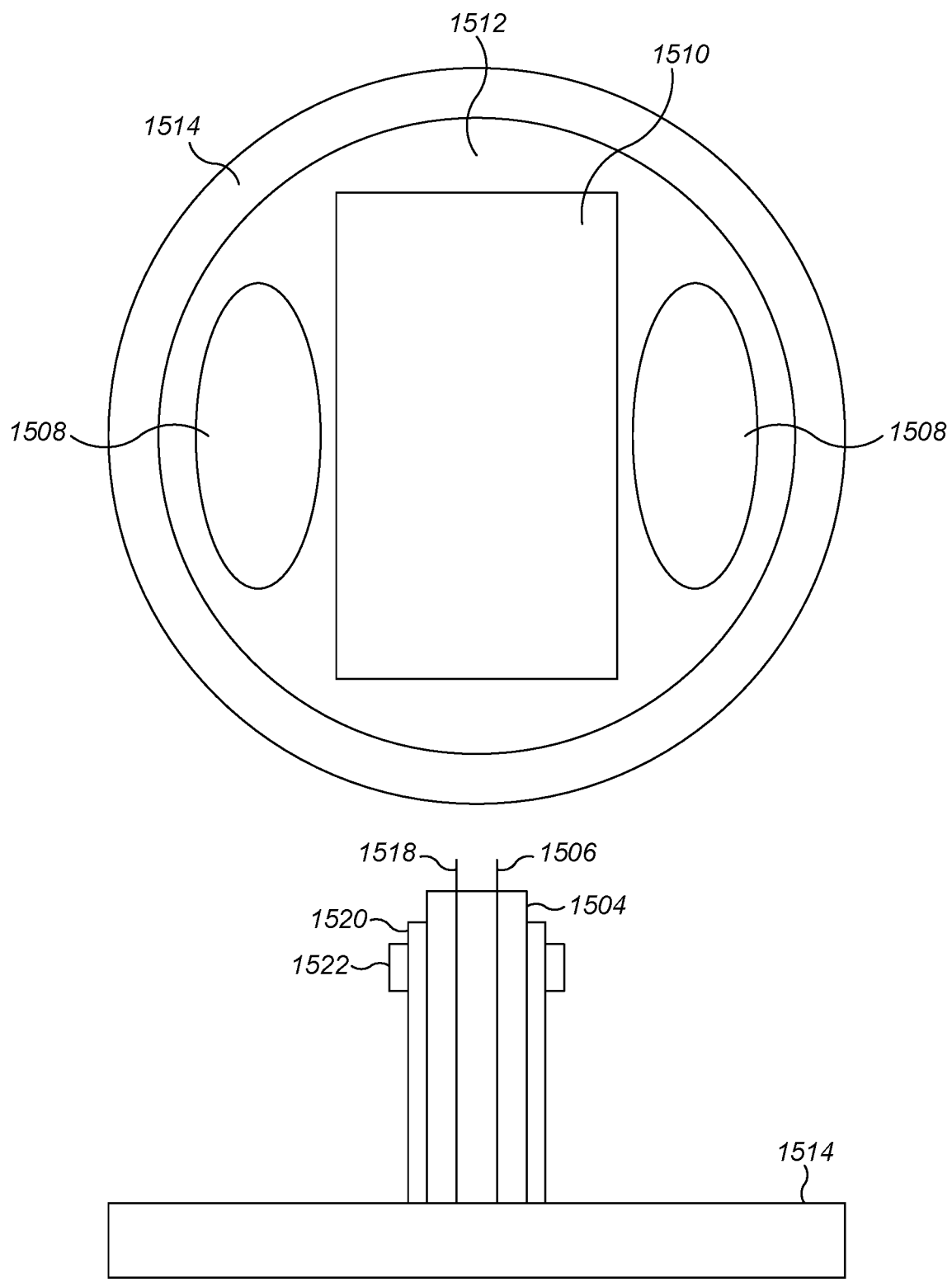
FIG. 15 shows the steering wheel design and controls for the vehicle.

FIG. 15 shows the location of the touch screen panel 1510 inside of steering wheel 1514. The steering wheel 1514 rotates around fixed center 1512. The fixed center 1512 contains safety air bags 1508. The fixed center 1512 is mounted by pipe 1504 while steering wheel 1502 is attached to and rotates coaxial pipe 1520 with steering gear 1522. Inside the fixed pipe 1504 are wires for power 1518 and redundant wire communication 1506. This description is industrially applicable for mass transit system and saves energy and time for commuters.

What is claimed is:

1. A system for a modified space and energy transportation management, comprising:
    a specific vehicle having an uniform speed capability, with at least one of an autonomous capability and a driver enabled capability to carry a passengers from one destination to another, the specific vehicle having a modified wheel design to travel in a dedicated lane and on a normal roadway;
    the dedicated lane modified from an existing roadway to accommodate the specific vehicle with the modified wheel design and a roadway power delivery by a non-lethal means; wherein the dedicated lane has a rail that accommodates the hard electrically conductive center ring of the tire and enables the specific vehicles to travel in the dedicated lane in a roadway powered mode; wherein the modified wheel design consists of a tire that has a hard electrically conductive center ring to contact a rail on the dedicated lane and the outer surface of the tire is a softer and wider in diameter than the hard electrically conductive center ring to contact normal roadway, wherein the hard electrically conductive center ring located in a modified tire connects with an electrical circuit connection to provide power to the specified vehicle;
    wherein the dedicated lane also has an indentation to accommodate the steering of the specified vehicle having a modified wheel design using the outer and softer portion of the tire at an entry/exit areas of the dedicated lane and enables transition of the specified vehicle at a high speed in and out of the dedicated lane; and
    a traffic management system to centrally control the specific vehicle and a uniform traffic flow on a rail or highway or local street enabling the passenger to make a reservation in real time and a guaranteed travel and duration prediction to reach a destination.

2. The system according to claim 1, wherein there is a transition area where the modified tire of the specific vehicle can transition by a driver or by a remote control from one lane to another without damaging the tires.

3. The system of claim 2, wherein the rails on the dedicated lane has the non-lethal power delivery capability to power and charge the specific vehicle at 100-150 Amps equivalent at 50-70 Volts.

4. The system of claim 1, wherein the traffic management system comprises of a time estimate and arrival guarantee module which calculates input from other modules to minimize commute time for the passenger and enables the system to predict accurate travel time,
    the specific vehicle that is qualified by a qualified vehicle module enables entry of selected specific vehicles in to an express way system, wherein the entry can be restricted by qualified software or by physical shape (½ wide),
    a secure user interface enables the passenger to access a common access point data to make a reservations, using public internet access as passenger;
    a data analytics calculates free space size to define train space size and calculates segment throughput to predict time estimate and arrival guarantee and in conjunction with a passenger reservation module, a traffic messaging module and a performance management module allocates an optimum number of passengers at the specific time and the specific vehicle so the space, time and traffic are maintained at maximum capacity;
    a statistical analytics with a traffic control module, the passenger reservation module allocates extra trains that are made up of several specific vehicles joined together and/or increase number of lanes so more passengers are accommodated;
    an issue engine records glitches that the specific vehicle or the passenger experienced, lane changes, accidents, power supply, battery life of the specific vehicle for maintenance, ride sharing historical perspective and feed the results to a database; and
    a traffic messaging module helps the driver, rider and the specific vehicle occupants to receive, send messages about status, confirmation of reservation and allocates the resources to manage the traffic management system.

5. The system of claim 4, further comprising:
    the traffic control module to calculate a traffic pattern based on a route, time and geo positional information to regulate the traffic.

6. The system of claim 4, further comprising:
    a road design assessment module to regulate an inflow and out flow of the specific vehicle considering the movement of a vehicle in the dedicated lane.

7. The system of claim 4, further comprising:
    a lane control module allocates a right distance between two specific vehicles to minimize an allocated road space to maximize flow of traffic, maximum vehicle movement and smooth flow of traffic at a uniform speed.

8. The system of claim 4, further comprising:
    a passenger reservation module allocates an optimum number of passengers at a specific time and adds another specific vehicle so the space, time and traffic are maintained at maximum capacity.

9. The method of claim 1, wherein the specific vehicle has a capability for a high speed lane change from a conventional lane to a modified dedicated lane using the on board controller and a traffic management software.

10. The method of claim 1, wherein the specific vehicle has a two rail brake system.

11. A system for a modified space and energy transportation management, comprising:
    a specific vehicle having a remote master speed from a traffic management system and a specific vehicle controller adjusted speed, with at least one of an autonomous capability and a driver enabled capability to carry a passenger from one destination to another, the specific vehicle having a modified wheel design for traveling in a dedicated lane and on a normal roadway;
    the dedicated lane modified from an existing roadway to accommodate the specific vehicle with the modified wheel design, a two rail brake system and an electric power delivery connection, wherein the dedicated lane has a rail that accommodates a hard electrically conductive center ring of the tire and enables the specific vehicles to travel in the dedicated lane in a roadway powered mode; and a traffic management system to control the specific vehicle and a traffic flow on a highway or local street, wherein the traffic management system comprises of:

a qualified vehicle module enables entry of selected vehicles in to an express way system;

a time estimate and arrival guarantee module calculates input from other modules to minimize a commute time for the passenger and enables the system to predict accurate travel time;

a secure user interface enables the passenger to access the common access point data for making reservations, using public internet access as passenger;

a data analytics to calculates free space size to define train space size and calculates segment throughput using several statistical calculations to predict time estimate and arrival guarantee and in conjunction with a passenger reservation module, a traffic messaging module and a performance management module allocates an optimum number of passengers at the specific time and the specific vehicle so the space, time and traffic are maintained at maximum capacity;

a statistical analytics with a traffic control module, the passenger reservation module allocates extra trains that are made up of several specific vehicles joined together and/or increase number of lanes so more passengers are accommodated;

an issue engine records a glitches, rides performed, lane changes, accidents, power supply, battery life of the specific vehicle for maintenance, ride sharing historical perspective and feed the results to a database; and a traffic messaging module helps the driver, the passenger and the specific vehicle occupants to receive, send messages about status, confirmation of reservation and allocate a resources to manage the traffic management system.

12. A method of using a modified space and energy transportation management system, comprising:

transporting passengers in a specific vehicle which runs in a dedicated lane at a specific speed and distance from other specific vehicle in the same lane;

controlling an entry and exit of the specific vehicle to/from the dedicated lane using a traffic management system for synchronization of space, speed and volume of vehicle number for a specific time and traffic pattern; and spacing the specific vehicles and a regular vehicle using traffic management system to optimize a travel time, energy efficiency, traffic control and passenger volume, wherein for the travel time a time estimate and arrival guarantee module calculates input from other modules to minimize the commute time for the passenger and enables the system to predict accurate travel time, wherein for controlling the traffic control and passenger volume a secure user interface enables the passenger to access a common access point data for making reservations, using public internet access as passenger;

modifying a wheel design for the specific vehicle to travel in the designated lane, wherein the wheel design that is modified consists of a tire that has a hard electrically conductive center ring to contact an electric rail on the dedicated lane and allows the specified vehicle to run on battery that is energized by the electric rail; and calculating a free space size to define train space size and segment throughput using several statistical calculations to predict time estimate and arrival guarantee and in conjunction with a passenger reservation module, a traffic messaging module and a performance management module is performed by a data analytics to allocate an optimum number of passengers at the specific time and the specific vehicle so the space, time and traffic are maintained at maximum capacity.

13. The method of claim 12, further comprising:
eliminating a driver control of the specific vehicle using a traffic management software and driverless car technology.

14. The method of claim 12, further comprising:
eliminating random lane changes by using the lane control module to maximize safety in relation to regular vehicular multi-lane traffic.

15. The method of claim 12, further comprising:
optimizing distances between the specific vehicle and a preceding vehicle to minimize empty space and control the traffic flow using an on board controller and a traffic management software.

* * * * *